(12) United States Patent
Park et al.

(10) Patent No.: US 8,145,188 B2
(45) Date of Patent: Mar. 27, 2012

(54) METHOD FOR CALL CHARGE TRANSFER BETWEEN MOBILE COMMUNICATION TERMINALS

(75) Inventors: So Jeong Park, Daejeon-si (KR); Bo Keun Kim, Seoul (KR); Dong Han Kang, Daegu Metropolitan (KR); Jae Gwan Shin, Daegu Metropolitan (KR); Chang Min Oh, Daegu Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 961 days.

(21) Appl. No.: 11/640,922

(22) Filed: Dec. 19, 2006

(65) Prior Publication Data

US 2007/0190971 A1   Aug. 16, 2007

(30) Foreign Application Priority Data

Feb. 13, 2006   (KR) ........................ 10-2006-0013465

(51) Int. Cl.
*H04M 11/00* (2006.01)
(52) U.S. Cl. .................. 455/406; 379/114.01; 379/338; 379/466; 379/212; 379/88.19; 455/564; 455/566; 455/400; 455/433; 455/435.2; 455/445; 455/426.1; 455/465; 455/428; 455/422.1; 370/338; 370/395.2
(58) Field of Classification Search .................. 455/406, 455/436, 560, 445, 426.1, 465, 428, 424, 455/422.1, 435.2, 407, 446, 429, 421, 564, 455/556, 413, 433; 705/37, 28, 34; 379/114.01, 379/338, 466, 212.1, 142.06, 88.19, 93.19, 379/127.03, 395.2, 211.01, 126, 211.02, 379/212.3, 21.02, 214.01, 201.01, 114.21, 88.11, 67.1, 355.02; 370/338, 395.2
See application file for complete search history.

(56) References Cited

U.S. PATENT DOCUMENTS

| 4,814,972 | A | * | 3/1989 | Winter et al. .................. 709/227 |
| 5,210,789 | A | * | 5/1993 | Jeffus et al. ............. 379/127.01 |
| 5,590,178 | A | * | 12/1996 | Murakami et al. ......... 379/93.18 |
| 5,617,471 | A | * | 4/1997 | Rogers et al. ............ 379/212.01 |
| 5,819,180 | A | * | 10/1998 | Alperovich et al. .......... 455/465 |
| 7,076,037 | B1 | * | 7/2006 | Gonen et al. ............. 379/114.02 |

(Continued)

FOREIGN PATENT DOCUMENTS

KR   1998-045069   9/1998

(Continued)

*Primary Examiner* — Rafael Perez-Gutierrez
*Assistant Examiner* — Joseph Arévalo
(74) *Attorney, Agent, or Firm* — Roylance, Abrams, Berdo & Goodman, LLP (57) ABSTRACT

A mobile terminal and method for transferring call charges between mobile terminals are disclosed. To transfer call-related charges between mobile terminals, the mobile terminal and call charge transfer method place a call by a calling mobile terminal to a called mobile terminal to establish a call connection for conversation, transmit a call transfer request by the calling mobile terminal to impose call-related charges on the called mobile terminal, and perform, if the called mobile terminal accepts the call transfer request, a call transfer operation to impose the call-related charges on the called mobile terminal, and maintain, if the called mobile terminal rejects the call transfer request, the call to impose the call-related charges on the calling mobile terminal. As a result, during a call between mobile terminals, the called user can accept a call transfer request of the calling user to transfer call-related charges to the called party, thereby enabling flexible and efficient billing.

9 Claims, 6 Drawing Sheets

U.S. PATENT DOCUMENTS

| | | | |
|---|---|---|---|
| 7,437,155 B2 * | 10/2008 | Levitan | 455/433 |
| 7,505,763 B2 * | 3/2009 | Rodriguez et al. | 455/420 |
| 2002/0027980 A1 * | 3/2002 | Kowalski | 379/142.06 |
| 2002/0075896 A1 * | 6/2002 | Astleitner et al. | 370/466 |
| 2004/0029561 A1 * | 2/2004 | Holter et al. | 455/405 |
| 2004/0033815 A1 * | 2/2004 | Noldus et al. | 455/560 |
| 2004/0190698 A1 * | 9/2004 | Kowalski | 379/142.06 |
| 2004/0196816 A1 * | 10/2004 | Koskinen et al. | 370/338 |
| 2005/0101329 A1 * | 5/2005 | Gallagher | 455/436 |
| 2005/0181796 A1 * | 8/2005 | Kumar et al. | 455/445 |
| 2006/0126819 A1 * | 6/2006 | Heimbecher | 379/373.01 |
| 2006/0136310 A1 * | 6/2006 | Gonen et al. | 705/28 |
| 2006/0147006 A1 * | 7/2006 | Gonen et al. | 379/114.11 |
| 2006/0177029 A1 * | 8/2006 | Dotan et al. | 379/114.01 |
| 2006/0188084 A1 * | 8/2006 | Rogers et al. | 379/265.01 |
| 2006/0227957 A1 * | 10/2006 | Dolan et al. | 379/212.01 |
| 2006/0229060 A1 * | 10/2006 | Gruchala et al. | 455/406 |
| 2006/0229066 A1 * | 10/2006 | Rodriguez et al. | 455/420 |
| 2006/0247999 A1 * | 11/2006 | Gonen et al. | 705/37 |
| 2007/0010245 A1 * | 1/2007 | Levitan | 455/426.1 |
| 2007/0064682 A1 * | 3/2007 | Adams et al. | 370/352 |
| 2007/0127663 A1 * | 6/2007 | Bae et al. | 379/201.01 |
| 2007/0281679 A1 * | 12/2007 | Rodriguez et al. | 455/420 |
| 2008/0132208 A1 * | 6/2008 | Lee et al. | 455/411 |

FOREIGN PATENT DOCUMENTS

| | | |
|---|---|---|
| KR | 100215967 B1 | 5/1999 |
| KR | 1020040084115 A | 10/2004 |

* cited by examiner

FIG. 5

METHOD FOR CALL CHARGE TRANSFER BETWEEN MOBILE COMMUNICATION TERMINALS

CROSS-REFERENCE TO RELATED APPLICATIONS

This application claims the benefit under 35 U.S.C. §119 (a) of Korean Patent Application Serial No. 2006-0013465 filed in the Korean Intellectual Property Office on Feb. 13, 2006, the entire disclosure of which is hereby incorporated by reference.

BACKGROUND OF THE INVENTION

1. Field of the Invention

The present invention relates generally to a mobile terminal and method for transferring call charges. More particularly, the present invention relates to a mobile terminal and method of transferring call charges between mobile terminals wherein a charge associated with a call between mobile terminals can be transferred to a party having an advantageous fee charging structure to reduce user expenses.

2. Description of the Related Art

A mobile terminal is a wireless communication device that can be readily carried and moved by a person for communication at most times and places. Such a mobile terminal as a mobile station (MS) can be freely moved in service areas formed by base stations (BS) of a mobile network system to which the mobile terminal is subscribed, and used to make a wireless connection to a desired recipient through a communication path established by monitoring, controlling and switching operations of a mobile switching center (MSC).

In recent years, mobile terminals have become popularized and are currently carried by numerous users.

A user carrying a mobile terminal may place/receive a call to/from another user. Sometimes, during an ongoing call, it may be difficult for a user to identify which of the parties placed the call and which received the call. An ordinary mobile terminal displays, as information about the other party, a registered name and phone number if the other party is registered in a phone number list, or only a phone number if the other party is not registered, and does not display calling/called party information. Hence, it may be difficult for the user to identify which of the parties is the calling party and which is the called party prior to termination of the current call.

A user may be inconvenienced if they are unable to use their mobile terminal owing to discharge of the battery or loss of the mobile terminal itself. The user may be more inconvenienced if public or wired phones are not immediately available.

In such situations, the user may try to use another person's mobile terminal. However, because of a call charge, the other person may be reluctant to allow the user to use their mobile terminal, and therefore the user may encounter difficulty in using another person's mobile terminal.

To solve this call charge problem in the use of another person's mobile terminal, Korean Patent Publication No. 2004-0017464 discloses a call charge method wherein, in the case of a call made by use of another person's mobile terminal, an associated call charge is imposed on a mobile phone number designated by the user. However, this call charge method requires a complex authentication procedure including password input, thereby lengthening the time in use of another person's mobile terminal.

Korean Patent Publication No. 2005-0104776 discloses another call charge method wherein if a call is placed by a person registered in an allotment list stored in a mobile terminal, the call is treated as a collect call. This call charge method enables the called party to be appointed in advance to pay the call charge. However, the method does not permit change of the paying party during an ongoing call, thereby imposing an entire charge associated with the call on the called party.

Accordingly, there is a need for an improved mobile terminal and method for transferring call charges between mobile terminals.

SUMMARY OF THE INVENTION

Exemplary embodiments of the present invention address at least the above problems and/or disadvantages and provide at least the advantages described below. Accordingly, an aspect of the present invention is to provide a method of displaying calling/called party information on a mobile terminal.

Another object of the present invention is to provide a method of call charge transfer between mobile terminals.

In accordance with an exemplary embodiment of the present invention, there is provided a mobile terminal and method for transferring a call charge between mobile terminals, comprising placing a call by a calling mobile terminal to a called mobile terminal to establish a call connection for conversation, transmitting a call transfer request by the calling mobile terminal to impose call-related charges on the called mobile terminal, and performing, if the called mobile terminal accepts the call transfer request, a call transfer operation to impose the call-related charges on the called mobile terminal, and maintaining, if the called mobile terminal rejects the call transfer request, the call to impose the call-related charges on the calling mobile terminal.

In accordance with another exemplary embodiment of the present invention, there is provided a mobile terminal and method for transferring a call charge between mobile terminals, comprising placing a call by a calling mobile terminal to a called mobile terminal to establish a call connection for conversation, transmitting a call charge transfer request by the calling mobile terminal to impose call-related charges on the called mobile terminal, and setting, if the call charge transfer request is accepted, paying party data of a billing server in a mobile switching center to the called mobile terminal, and maintaining, if the call charge transfer request is rejected, the paying party data of the billing server in the mobile switching center.

In an exemplary embodiment of the present invention, during a call between mobile terminals, the called user may accept a call transfer request of the calling user to transfer call-related charges to the called party, thereby enabling flexible and efficient billing.

BRIEF DESCRIPTION OF THE DRAWINGS

The above and other objects, features and advantages of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
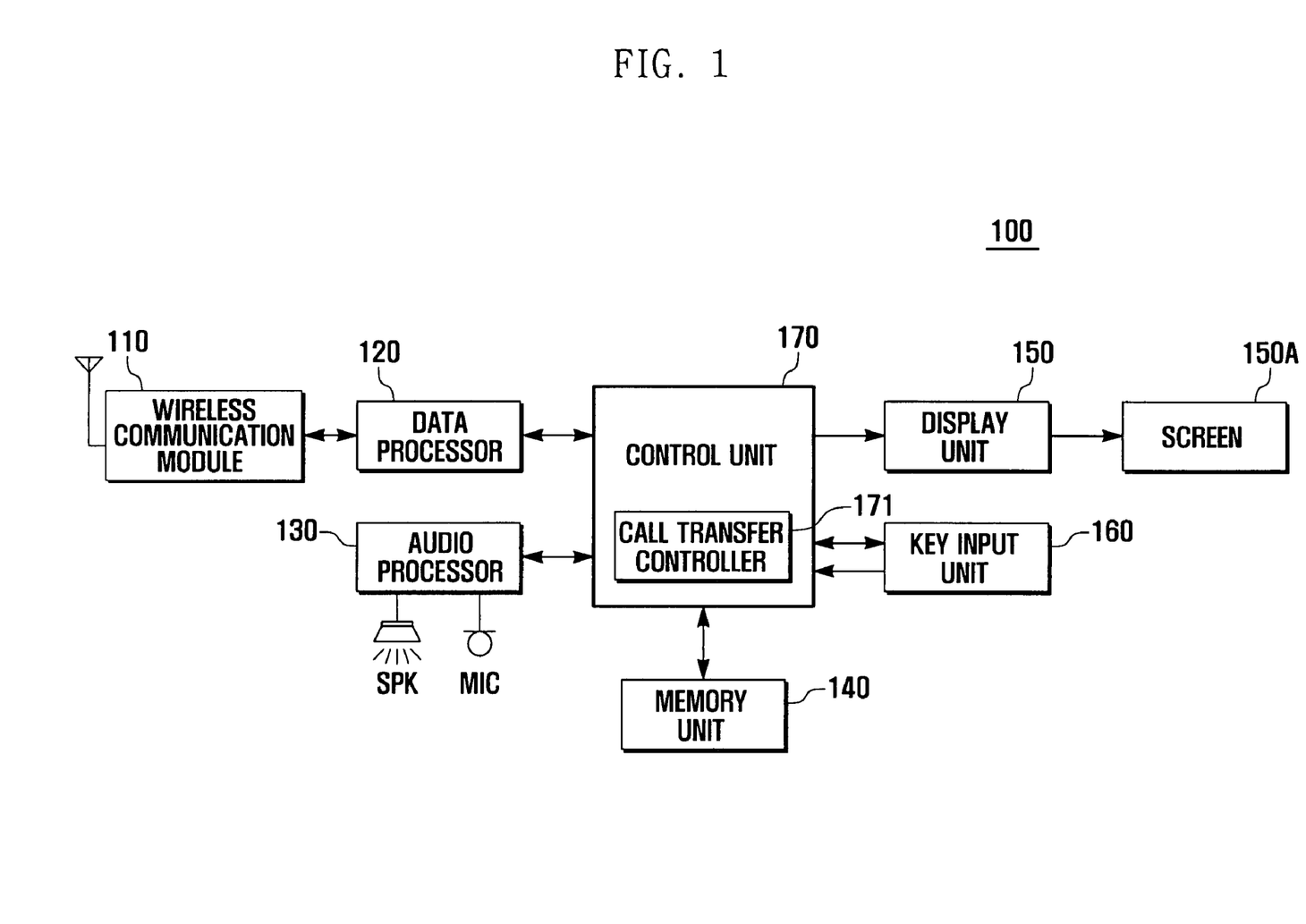
FIG. 1 is a block diagram showing the configuration of a mobile terminal related to an exemplary embodiment of the present invention.

As shown in FIG. 1, the exemplary mobile terminal comprises a wireless communication module 110, a data processor 120, an audio processor 130, a memory unit 140, a display unit 150, a key input unit 160, and a control unit 170.

The wireless communication module 110 performs data transmission and reception operations for the mobile terminal. The wireless communication module 110 includes a radio frequency (RF) transmitter for up-converting the frequency of a signal to be transmitted and amplifying the signal, and an RF receiver for low-noise amplifying a received signal and down-converting the frequency of the signal. The wireless communication module 110 establishes channels for voice and data communication with external communication devices, and transmits/receives short messages to/from external communication devices. In an exemplary embodiment, during an ongoing call between calling and called mobile terminals, the calling mobile terminal transmits a 'call transfer request' signal to the called mobile terminal when a 'call transfer' menu item is selected by the calling user, and the called mobile terminal transmits a 'call transfer accept' signal to the calling mobile terminal according to a selection of the called user.

The data processor 120 includes a transmission module for encoding and modulating a signal to be transmitted through a wireless channel, and a reception module for demodulating and decoding a signal received through a wireless channel.

The audio processor 130 may include a coder/decoder (codec). The codec includes a data codec for processing packet data, and an audio codec for processing an audio signal such as a voice signal. The audio processor 130 converts a digital audio signal from the data processor 120 into an analog signal through the audio codec to reproduce the analog signal through a speaker SPK. The audio processor 130 also converts an analog audio signal from a microphone MIC into a digital audio signal through the audio codec to output the digital audio signal to the data processor 120.

The memory unit 140 stores programs for controlling general operations of the mobile terminal, and data resulting from execution of the programs.

The display unit 150 displays input display data on a screen 150A under the control of the control unit 170. In an exemplary embodiment of the present embodiment, the display unit 150 may also display a 'call transfer' menu item under the control of the control unit 170 during a call, and display call transfer steps if the user selects the 'call transfer' menu item.

The key input unit 160 includes a plurality of keys for inputting numerals and characters, and a plurality of control keys for controlling operations of the mobile terminal. In an exemplary embodiment of the present embodiment, a 'call transfer' menu item may be selectable during a call by the user through the key input unit 160.

The control unit 170 controls the overall operation of the mobile terminal. The control unit 170 also controls data transmission and reception. In an exemplary embodiment of the present embodiment, the control unit 170 displays calling/called party information from the wireless communication module 110 through the display unit 150.

During a call between calling and called mobile terminals, a control unit 170 of the calling mobile terminal transmits a 'call transfer request' signal through a wireless communication module 110 thereof to the called mobile terminal when a 'call transfer' menu item is selected by the calling user. In reply, upon reception of the 'call transfer request' signal, a control unit 170 of the called mobile terminal transmits a 'call transfer accept' signal through a wireless communication module 110 thereof to the calling mobile terminal according to a selection of the called user.

After completion of the call transfer, each control unit 170 preferably displays calling/called party information corresponding to the transferred call through the display unit 150 to inform the user.

Figure 2:
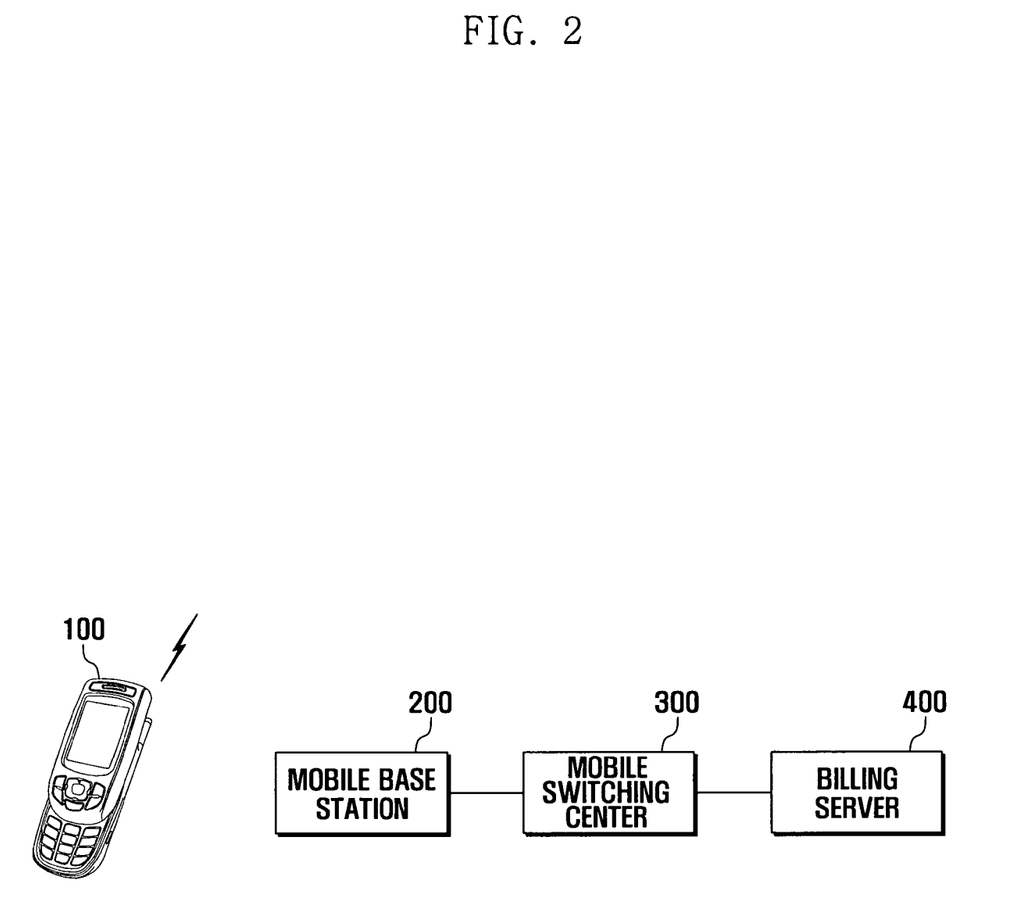
FIG. 2 is a schematic diagram showing the configuration of a call charge transfer apparatus according to an exemplary embodiment of the present invention.

FIG. 2 is a block diagram showing the configuration of a call charge transfer apparatus for a mobile communication system according to an exemplary embodiment of the present invention.

Referring to FIG. 2, the call charge transfer apparatus comprises a plurality of mobile terminals 100, one or more mobile base stations 200, one or more mobile switching centers 300, and a billing server 400.

In a call-connected state, a calling mobile terminal 100 transmits a 'call transfer request' signal to a called mobile terminal 100. After reception of the 'call transfer request' signal, the called mobile terminal 100 transmits in reply a 'call transfer accept' signal to the calling mobile terminal 100. Under a call transfer agreement between the calling and called mobile terminals 100, the billing server 400 switches the paying party registered thereat to the called mobile terminal 100.

Additionally, under the call transfer agreement, the calling and called mobile terminals 100 terminate the current call connection. The called mobile terminal 100 then places a new call to the calling mobile terminal 100, thereby resulting in the call transfer through a call reconnection.

A mobile base station 200 makes wireless connections between calling and called mobile terminals 100 in a service area to transmit/receive communication signals including 'call setup request' signals and associated reply signals.

A mobile switching center 300 connects to mobile base stations 200, establishes communication paths in response to 'call setup request' signals, and controls and monitors the billing server 400 to charge fees on paying parties on a communication time basis. In the present exemplary embodiment, the mobile switching center 300 controls the switching of a paying party when a corresponding 'call transfer accept' signal is received in reply to a 'call transfer request' signal.

The billing server 400 connects to a mobile switching center 300, and charges fees to paying parties selected under the control of the mobile switching center 300. In the present exemplary embodiment, when a paying party is changed according to a call transfer agreement between two mobile terminals 100, the billing server 400 switches the paying party in response to a control signal from the mobile switching center 300.

Figure 3:
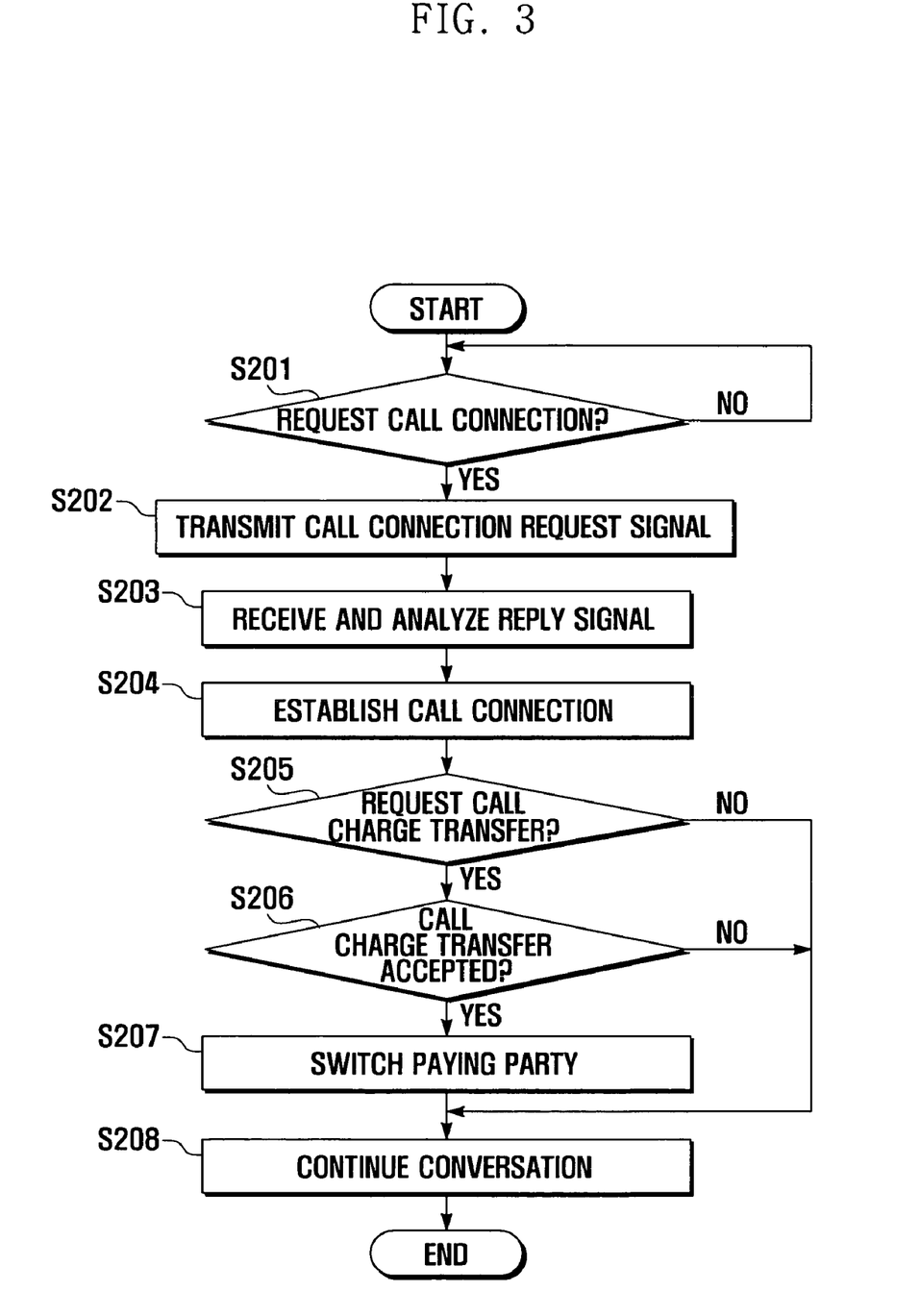
FIG. 3 is a flow chart illustrating a method of call charge transfer between mobile terminals according to an exemplary embodiment of the present invention.

FIG. 3 is a flow chart illustrating a method of call charge transfer between mobile terminals according to an exemplary embodiment of the present invention.

Referring to FIGS. 2 and 3, a mobile switching center 300 determines whether a call connection request exists at step S201. If a call connection request exists, the mobile switching center 300 identifies a calling mobile terminal 100 associated with the call connection request, and transmits a 'call setup request' signal to a corresponding called mobile terminal 100 (S202). The called mobile terminal 100 transmits in reply a 'call setup accept' signal to the calling mobile terminal 100, which then analyzes received information to set up a communication path according to the control of the mobile switching center 300 at step S203. The calling mobile terminal 100 then establishes a call connection to the called mobile terminal 100 at S204. After establishment of the call connection, the calling and called mobile terminals 100 may display, respectively, calling and called party information related with fee payment on screens, to inform the calling and called users of which is the calling party and which the called party.

During the call, the calling mobile terminal 100 determines whether a 'call charge transfer' request is input by the calling user at step S205. If a 'call charge transfer' request is not input, the calling mobile terminal 100 performs step S208 (described later) to continue conversation.

If the 'call charge transfer' request is input, the calling mobile terminal 100 transmits a 'call charge transfer request' signal through the mobile switching center 300 to the called mobile terminal 100, and determines whether a 'call charge transfer accept' signal is received from the called mobile terminal 100 in reply to the 'call charge transfer request' signal at step S206. The called user may manipulate a 'call transfer' menu displayed on the screen of the called mobile terminal 100 with direction keys to transmit the 'call charge transfer accept' signal.

If the 'call charge transfer accept' signal is not received, the calling mobile terminal 100 performs step S208 to continue conversation.

If the 'call charge transfer accept' signal is received, the paying party is switched from the calling mobile terminal 100 to the called mobile terminal 100 at step S207. The existing call is maintained in a call charge transferred state at step S208. After the call charge transfer, to report the switch of the paying party a called party indicator may be displayed on the screen of the calling mobile terminal 100 and a calling party indicator may be displayed on the screen of the called mobile terminal 100. In addition, because of the switch of the paying party, call-related fees prior to the switch of the paying party are imposed on the former calling mobile terminal 100, and call-related fees after the switch of the paying party are imposed on the former called mobile terminal 100.

Figure 4A:
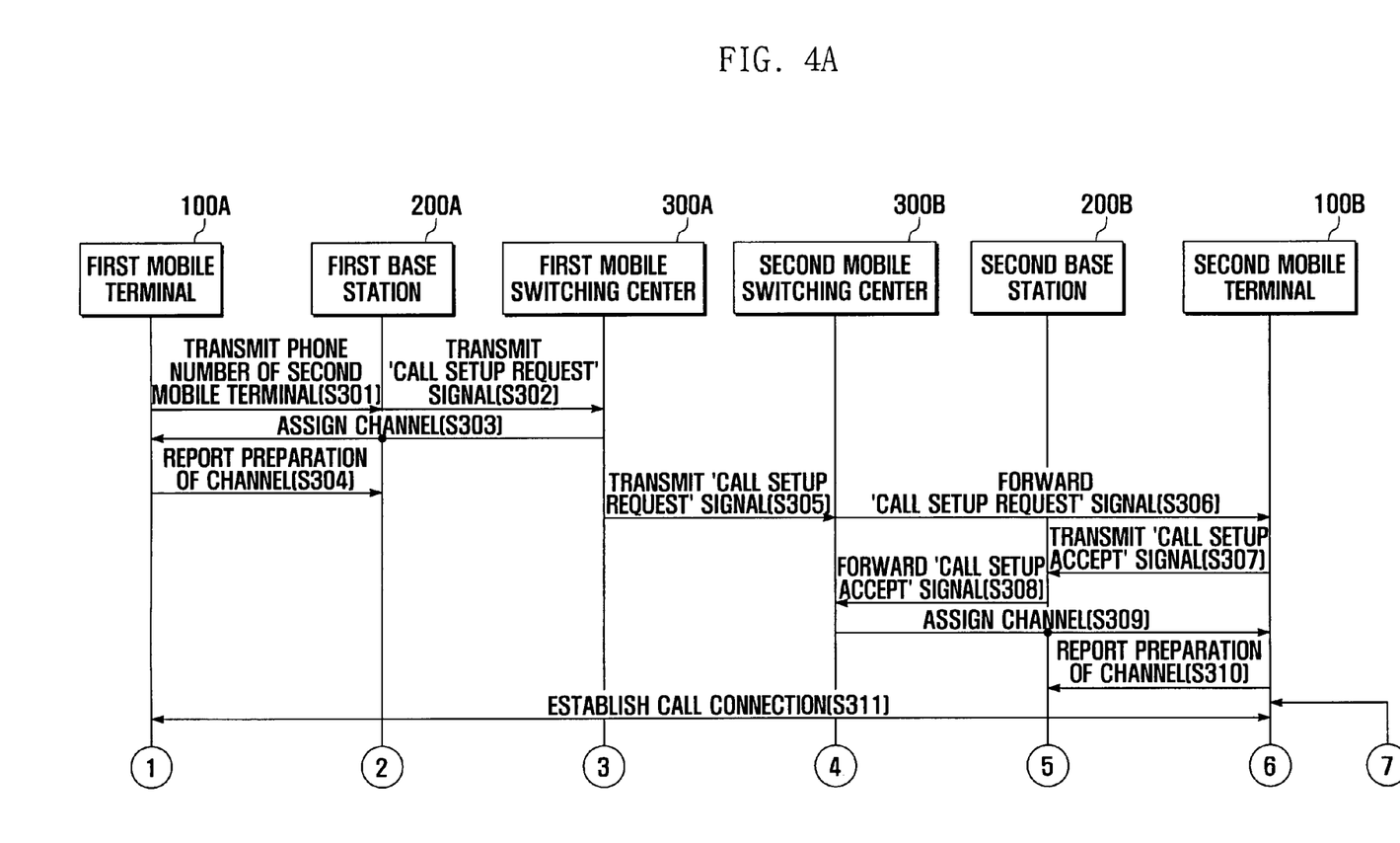
FIGS. 4A to 4B are flow diagrams illustrating a method of call transfer between mobile terminals according to another exemplary embodiment of the present invention.
Figure 4B:
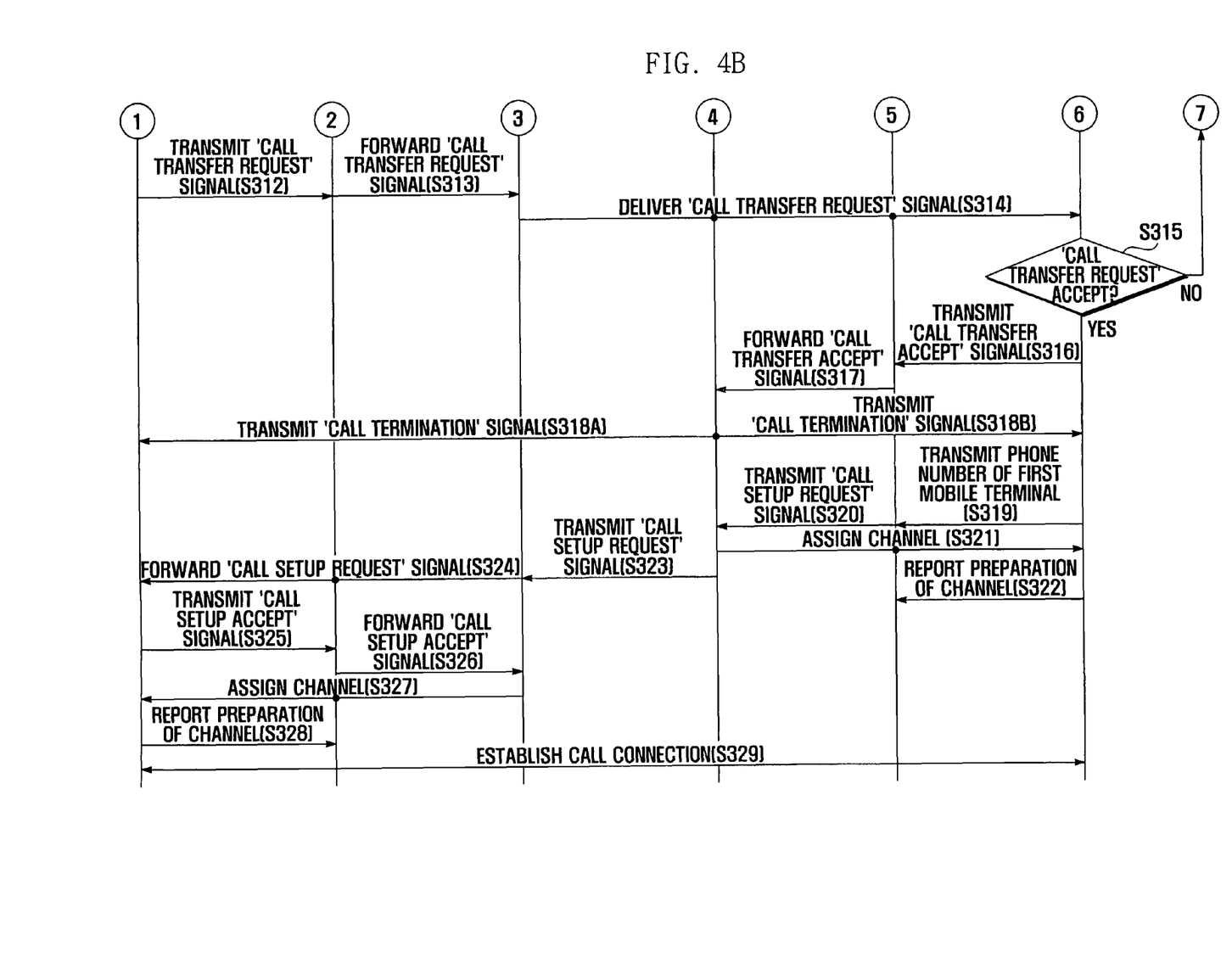

FIGS. 4A to 4B are flow diagrams illustrating a method of call transfer between mobile terminals according to an exemplary embodiment of the present invention.

Referring to FIGS. 2, 4A and 4B, a first mobile terminal 100A transmits the phone number of a second mobile terminal 100B to a first base station 200A in step S301. The first base station 200A transmits a 'call setup request' signal related with the received phone number to a first mobile switching center 300A in step S302. The first mobile switching center 300A assigns a channel to the first mobile terminal 100A via the first base station 200A in step S303, and the first mobile terminal 100A reports preparation of the channel to the first base station 200A in step S304.

The first mobile switching center 300A transmits the 'call setup request' signal to a second mobile switching center 300B that manages the phone number of the second mobile terminal 100B in step S305. The second mobile switching center 300B forwards the 'call setup request' signal to the second mobile terminal 100B via a second base station 200B in step S306. The second mobile terminal 100B transmits a 'call setup accept' signal in response to the 'call setup request' signal to the second base station 200B in step S307. The second base station 200B forwards the received 'call setup accept' signal to the second mobile switching center 300B in step S308. On the basis of the 'call setup accept' signal, the second mobile switching center 300B assigns a channel for the call to the second mobile terminal 100B via the second base station 200B in step S309, and the second mobile terminal 100B reports preparation of the channel to the second base station 200B in step S310.

After the preparation procedure described above, a call connection is established between the first mobile terminal 100A and second mobile terminal 100B in step S311, enabling conversation between the calling and called users.

After the call connection, the first mobile terminal 100A and second mobile terminal 100B display calling/called party information related with call charges on screens thereof to inform which is the calling party and which the called party. That is, a calling party indicator is displayed on the first mobile terminal 100A and a called party indicator is displayed on the second mobile terminal 100B.

If the calling user issues a 'call transfer' request, the first mobile terminal 100A transmits a 'call transfer request' signal to the first base station 200A in step S312, which then forwards the 'call transfer request' signal to the first mobile switching center 300A in step S313.

The calling user may manipulate a 'call transfer' menu displayed on the screen of the first mobile terminal 100A with direction keys to issue the 'call transfer' request.

The first mobile switching center 300A delivers the 'call transfer request' signal, via the second mobile switching center 300B and second base station 200B, to the second mobile terminal 100B in a call with the first mobile terminal 100A in step S314. The second mobile terminal 100B determines whether a 'call transfer accept' signal is input by the called user in reply to the delivered 'call transfer request' signal in step S315.

If a 'call transfer accept' signal is not input, the second mobile terminal 100B performs step S311.

If the 'call transfer accept' signal is input, the second mobile terminal 100B transmits a 'call transfer accept' signal to the second base station 200B in step S316, which then forwards the 'call transfer accept' signal to the second mobile switching center 300B in step S317. Upon reception of the 'call transfer accept' signal, the second mobile switching center 300B transmits a 'call termination' signal to the first mobile terminal 100A via the first mobile switching center 300A and first base station 200A in step S318A, and also transmits a 'call termination' signal to the second mobile terminal 100B via the second base station 200B in step S318B. After reception of the 'call termination' signal, the second mobile terminal 100B terminates the current call, and transmits the phone number of the first mobile terminal 100A to the second base station 200B in step S319, which then transmits a 'call setup request' signal to the second mobile switching center 300B in step S320. On the basis of the 'call setup request signal, the second mobile switching center 300B assigns a channel for the call to the second mobile terminal 100B via the second base station 200B in step S321, and the second mobile terminal 100B reports preparation of the channel to the second base station 200B in step S322. To setup a call connection with the first mobile terminal 100A, the second mobile switching center 300B transmits the 'call setup request' signal to the first mobile switching center 300A in step S323, which forwards the 'call setup request' signal to the first mobile terminal 100A via the first base station 200A in step S324. Upon reception of the 'call setup request' signal, the first mobile terminal 100A transmits in reply a 'call setup accept' signal to the first base station 200A in step S325, which then forwards the 'call setup accept' signal to the first mobile switching center 300A in step S326. The first mobile switching center 300A assigns a channel for the call to the first mobile terminal 100A via the first base station 200A in step S327, and the first mobile terminal 100A reports preparation of the channel to the first base station 200A in step S328.

In the call connection for the call charge transfer, the call connection may be made without a call waiting tone. Guide messages are preferably displayed on the screens to indicate the progress of the call transfer.

After the preparation procedure described above, a call connection is established between the first mobile terminal 100A and second mobile terminal 100B in step S329, enabling conversation between the calling and called users. A calling party indicator may be displayed on the second mobile terminal 100B and a called party indicator may be displayed on the first mobile terminal 100A.

FIGS. 5A to 5K are screen representations illustrating steps of call transfer between mobile terminals according to exemplary embodiments of the present invention.

Figure 5:
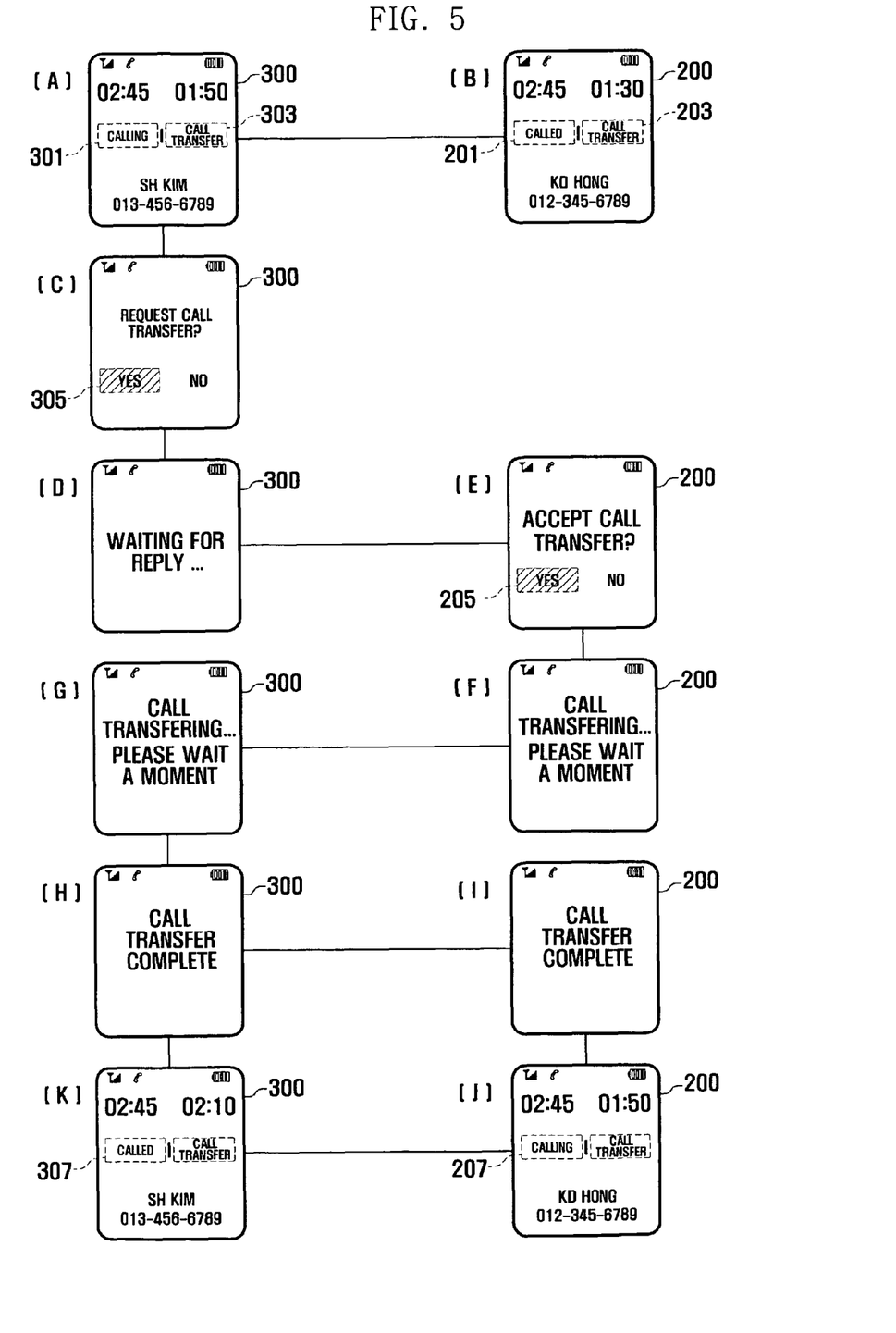
FIGS. 5A to 5K are screen representations illustrating a procedure of call transfer between mobile terminals according to an exemplary embodiment of the present invention.

After establishment of a call connection, a calling party indicator 301 and a 'call transfer' menu item 303 are displayed on a screen 300 of a calling mobile terminal as shown in FIG. 5A, and a called party indicator 201 and a 'call transfer' menu item 203 are displayed on a screen 200 of a called mobile terminal as shown in FIG. 5B. When the calling user selects the 'call transfer' menu item 303, a message asking whether to issue a call transfer request is displayed on the screen 300 as shown in FIG. 5C. If the calling user issues a call transfer request, the calling mobile terminal transmits a 'call transfer request' signal to the called mobile terminal, and displays on the screen 300 a message indicating a wait for a reply corresponding to the 'call transfer request' signal as shown in FIG. 5D. Upon reception of the 'call transfer request' signal, the called mobile terminal displays on the screen 200 a message asking whether to accept the call transfer request as shown in FIG. 5E. If the called user accepts the call transfer request, the called mobile terminal transmits a 'call transfer accept' signal, and displays on the screen 200 a message indicating a wait for call transfer as shown in FIG. 5F.

The calling mobile terminal also displays on the screen 300 a message indicating a wait for call transfer as shown in FIG. 5G. Upon completion of the call transfer, the calling and called mobile terminals display on the screens 300 and 200 messages indicating call transfer completion as shown in FIGS. 5H and 5I, respectively. In addition, the roles of the calling and called mobile terminals are exchanged with each other. That is, a calling party indicator 207 is displayed on the screen 200 of the new calling mobile terminal as shown in FIG. 5J, and a called party indicator 307 is displayed on the screen 300 of the new called mobile terminal as shown in FIG. 5K.

As apparent from the above description, exemplary embodiments of the present invention provide a method of call charge transfer between mobile terminals wherein calling/called party information is displayed on each screen during a call so that users can visually identify which is the calling party and which the called party.

In addition, during a call between mobile terminals, the called user can accept a call transfer request of the calling user to transfer call-related charges to the called party, thereby enabling flexible and efficient billing. For example, when the calling user pays 30 units of money per 10 seconds and the called user pays 9 units per 10 seconds, the users can reduce call-related charges by selecting a call transfer menu item without termination of an ongoing call and a subsequent call by the called user.

While exemplary embodiments of the present invention have been shown and described in this specification, it will be understood by those skilled in the art that various changes or modifications of the embodiments are possible without departing from the spirit and scope of the invention as defined by the appended claims including the full scope of equivalents thereof.

What is claimed is:

1. A method for call charge transfer between mobile terminals, the method comprising:
   a) establishing, by a mobile switching center, a call connection for conversation between a calling mobile terminal and a called mobile terminal;
   b) displaying, by the calling mobile terminal, a call transfer menu item for call transfer operation between the calling mobile terminal and the called mobile terminal and displaying, by the called mobile terminal, the call transfer menu item;
   c) transmitting, by the calling mobile terminal, a call transfer request to the mobile switching center when the call transfer menu item is selected by user;
   d) transmitting, by the mobile switching center, when receiving the call transfer request from the calling mobile terminal, a call transfer request to the called mobile terminal; and
   e) performing, by the mobile switching center, a call transfer operation between the calling mobile terminal and the called mobile terminal to impose subsequent charges of the call conversation to the called mobile terminal in response of accepting the call transfer request from the called mobile terminal.

2. The method of claim 1, wherein e) comprises:
   1) terminating, by the mobile switching center, the call connection between the calling mobile terminal and the called mobile terminal; and
   2) initiating, by the mobile switching center, a new call connection that the calling mobile terminal and the called mobile terminal is switched each other.

3. The method of claim 2, wherein 2) is performed without a call waiting tone.

4. The method of claim 1, further comprising displaying calling/called party information related with the charges of call conversation on a screen by the calling mobile terminal and the called mobile terminal.

5. The method of claim 1, further comprising displaying a called party indicator on a screen by the calling mobile terminal and displaying a calling party indicator on a screen by the called mobile terminal, to indicate a paying party change.

6. A method for call charge transfer between mobile terminals, the method comprising:
   a) establishing, by a mobile switching center, a call connection for conversation between a calling mobile terminal and a called mobile terminal;

b) displaying, by the calling mobile terminal, a call transfer menu item for changing a paying party for the call conversation from the calling mobile terminal to the called mobile terminal and displaying, by the called mobile terminal, the call transfer menu item;

c) transmitting, by the calling mobile terminal, a call charge transfer request to the mobile switching center when the call transfer menu item is selected by user;

d) transmitting, by the mobile switching center, when receiving the call charge transfer request from the calling mobile terminal, the call charge transfer request to the called mobile terminal; and e) controlling, by the mobile switching center, when receiving a response of accepting the call charge transfer request from the called mobile terminal, a billing server to change a paying party for the call conversation from the calling mobile terminal to the called mobile terminal.

7. The method of claim 6, further comprising displaying calling/called party information related with charges of the call conversation on a screen by the calling mobile terminal and the called mobile terminal.

8. The method of claim 6, wherein, at e), the mobile switching center controls the billing server to bill the charges of the call conversation to the called mobile terminal when receiving a response of accepting the call charge transfer request from the called mobile terminal, and to bill the charges of the call conversation to the calling mobile terminal when receiving a response of rejecting the call charge transfer request from the called mobile terminal.

9. The method of claim 6, further comprising displaying a called party indicator on a screen by the calling mobile terminal and displaying a calling party indicator on a screen by the called mobile terminal, to indicate a paying party change.

* * * * *